May 17, 1960   C. BOSCH   2,937,281
PORTABLE FM-IR DETECTING DEVICE
Filed May 19, 1958
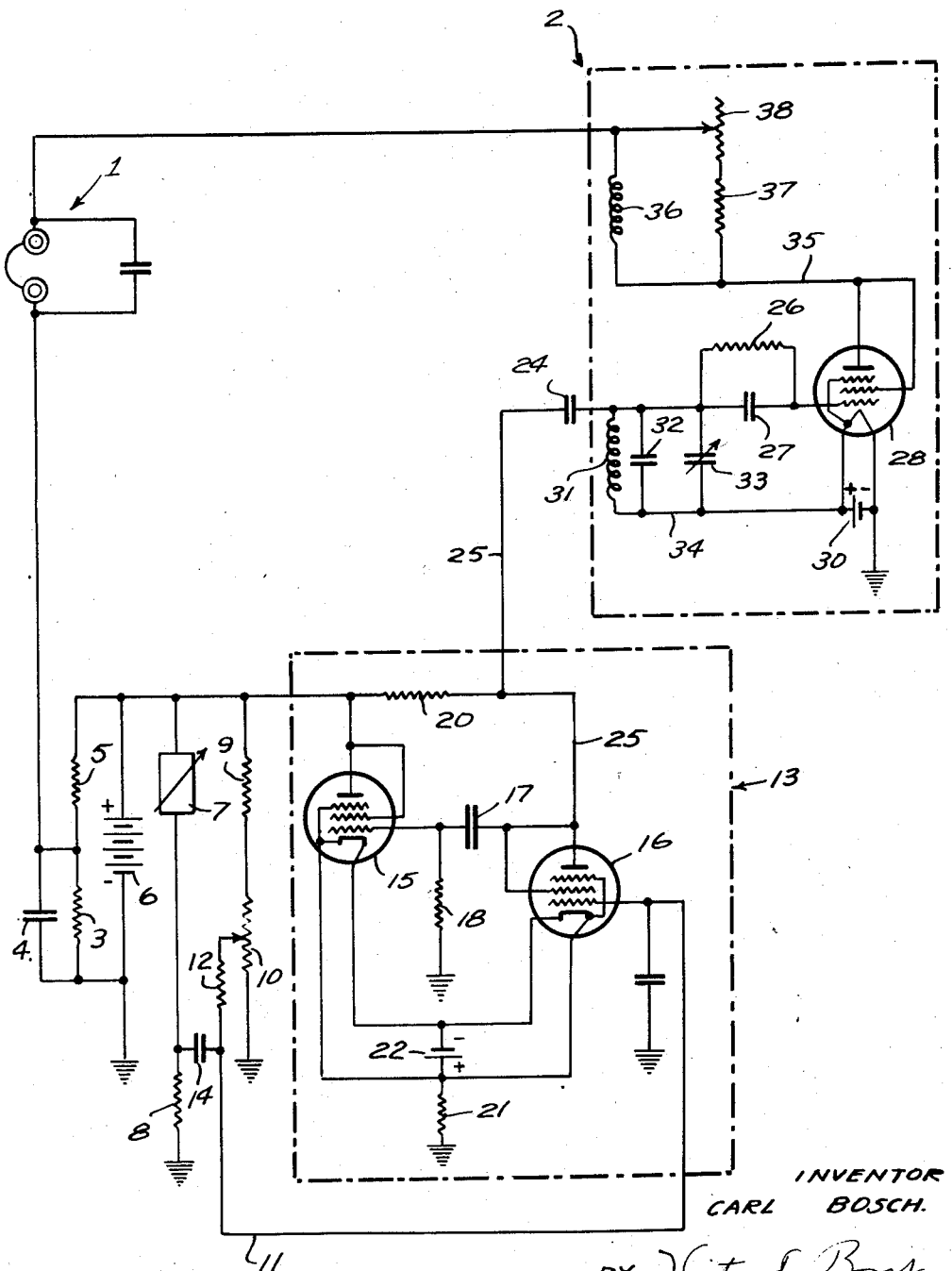
INVENTOR
CARL BOSCH.
BY Victor E. Borst
ATTORNEY United States Patent Office 2,937,281
Patented May 17, 1960

2,937,281

PORTABLE FM-IR DETECTING DEVICE

Carl Bosch, Larchmont, N.Y., assignor to Sperry Rand Corporation, Ford Instrument Company Division, Long Island City, N.Y., a corporation of Delaware Application May 19, 1958, Serial No. 736,146

2 Claims. (Cl. 250—83.3)

This invention relates to frequency modulators and particularly to frequency modulation detectors which have means for affording audio sensing of the frequency modulations. In general, the electronic detector, as contemplated by the invention, is adapted to respond to photoelectric devices and drive an oscillator to which there is connected a hearing unit which are employed to detect any changes occurring in the output of the phototubes. It is further contemplated that the photo device be such as will respond to radiation outside the visual range of frequencies thus giving to the frequency modulator special applications as, for example, in association with armaments. For instance, the frequency modulator detection system may be used on rifles having an infrared sight, the rifleman being given thereby the advantage of sighting his rifle in the dark by scanning it along the horizon. A change in tone of the note heard in the hearing device in accordance with changes in the thermal energy received by the system could be indicative of the unseen target.

More specifically, the detection system comprises an oscillating unit capable of delivering fundamental and harmonic frequencies, such as a multivibrator, controlled by a photo device which is responsive to infrared radiation. The multivibrator in turn is employed with a second oscillating unit, the beat frequency output of which is adapted to be heard by conventional earphones.

One object of the invention is to provide a sensing system having a capacity to produce modulation frequencies as a function of thermal energy flux.

Another object of the invention is to provide a portable frequency modulated infrared detection system which is peculiarly adapted for use in connection with rifle and artillery sights.

Other objects and advantages of the detection system may be appreciated on reading the following detailed description of one embodiment thereof which is taken in connection with the drawing which schematically illustrates a combination of sensing and detecting components arranged in accordance with the invention.

Referring to the drawing, capacitance shunted earphones 1 are connected between an oscillating detector 2 and between series connected resistors 3 and 5 which comprise a voltage dividing network. The voltage dividing network is connected across a battery 6 with resistor 3 being shunted by a condenser 4.

A commercially lead sulphide photoresistive element 7, such as the Eastman Kodak Company "Ektron" detector, is connected at one side thereof to the positive terminal of the battery 6 and the other side to a current limiting resistor 8. Also connected to the resistor 5 and disposed in parallel with the circuit containing the photoresistive element 7 and the current limiting resistor 8 is a circuit comprising a resistor 9 and resistor 10 in series therewith. A grid control lead 11 having a resistor 12 which is connected to a variable tap on the resistor 10 serves to control a multivibrator 13 by grid biasing of tube 16. The grid control lead 11 is coupled to the branch containing the photoresistive element 7 and the resistor 8 through a capacitor 14. The multivibrator 13 is a free-running cathode-coupled unit having a pair of pentode tubes 15 and 16 (connected as triodes) coupled together by capacitor 17 and resistor 18. The plate element of the pentode 15 is connected directly to the positive terminal of the battery 6 while the plate of the tube 16 is connected to battery 6 through plate resistor 20. The two tubes of the multivibrator share a common cathode resistor 21, their filament voltage being supplied by battery 22. The control grid of the pentode 15 is grid biased by the resistor 18 and coupled by capacitor 17, and controlled by these components in combination with the plate voltage of tube 16. The grid control for the latter tube is established by lead 11, the bias being set thereon by the variable tap on the resistor 10 and its control being exerted by the voltage across resistor 8 as determined by the photoresistive element 7. The second and third grids of the tubes 15 and 16 are connected to the plate and cathode electrodes, respectively. It may be seen that the period of the multivibrator 13 is inversely controlled by the voltage impressed on the grid control lead 11. As this voltage increases in the positive direction, the time constant for the discharge of the capacitor 17 is shortened, but is sufficient to operate the tube 15 and cut off the tube 16 by reason of the voltage increase across the cathode resistor 21. The converse being true when the voltage on the lead 11 is decreased by the photoresistive element 7 and the resistor 8. The multivibrator 13 is loosely coupled through capacitor 24 to the oscillating detector 2. The capacitor 24 is disposed in the plate lead 25 of the pentode 16 and thereby connects the multivibrator 13 to grid resistor 26 and shunted grid capacitor 27 of pentode 28 of the oscillating detector 2. The filament element of the pentode 28 is operated by a battery 30 and a tuning circuit comprising a grid coil 31, a capacitor 32 and a variable capacitor 33 which is connected across the lead 25 and a lead 34, lead 34 being connected to the positive terminal of the battery 30. The plate voltage of pentode 28 is supplied by the battery 6. The second and third grids of the pentode 28 are connected similarly as the pentodes in the multivibrator. Plate lead 35 of the pentode 28 serves to convey the oscillations of the oscillating detector 2 as modulated by the output of the multivibrator 13 to the earphones 1. The oscillating detector 2 is basically a conventional tickler feedback oscillator having a tickler coil 36 coupled to the grid coil 31. Resistor 37 and variable resistor 38 are provided in shunt of the tickler coil 36 serving to control the feedback through the tickler coil 36 by varying the current therethrough.

In operation, the device utilizes the photoresistive element 7 to vary the frequency of the multivibrator 13 in accordance with the intensity changes of infrared radiation incident on the sensing element. With the change in radiation intensity, there is a change in the resistance of the photoresistive element which in turn changes the current through the resistor 8 and the voltage across the latter which is placed on the grid of the tube 16 in the multivibrator 13. The instantaneous change in the control grid bias affects the triggering level of the tube 16 and thus the period of the multivibrator 13 making the grid of the tube 16 more positive, decreasing the period of the multivibrator 13 and vice-versa.

The oscillating detector 2 is tuned slightly off one of the harmonics of the modulating frequency output of the multivibrator 13 in order that the oscillator detector 2 may yield an audible beat frequency to the earphones 1. Thus, as the intensity of the infrared radiation striking the photoresistive element 7 changes, the multivibrator 13 changes its frequency which beats with the frequency of the oscillating detector 2, hence changing the beat frequency heard in the earphones 1. Accordingly, the change in tone heard in the earphones 1 may give an audible indication of the thermal radiation varying on the photoresistive element 7.

Various modifications of the embodiment of the invention as described herein may be effected by persons skilled in the art without departing from the principle and scope of invention as defined in the following claims.

What is claimed is:

1. A portable frequency modulating detection device comprising an impedance element adapted to be controlled by thermal radiation outside the visible frequency range, a voltage control element connected to said impedance element, a device adapted to generate multiple, harmonically related frequencies connected to said voltage control element, earphones, and an audio frequency generator driven by said device and having tuning means adapted to be tuned to one of said harmonically related frequencies, the output of said audio frequency generator being connected to said earphones.

2. A portable frequency modulating detection device comprising an impedance element adapted to be controlled by thermal radiation, a multivibrator connected to said impedance element, earphones, and an oscillating detector driven by said multivibrator and having tuning means adapted to be tuned to one of the harmonic frequencies of said multivibrator the output of said oscillating detector being connected to said earphones.

References Cited in the file of this patent

UNITED STATES PATENTS

| | | |
|---|---|---|
| 2,349,715 | Francis | May 23, 1944 |
| 2,473,197 | Evans | June 14, 1949 |
| 2,817,819 | Chamberlain | Dec. 24, 1957 |